CLASSIFICATION
811R4
DIVISION.
BEST AVAILABLE COPY
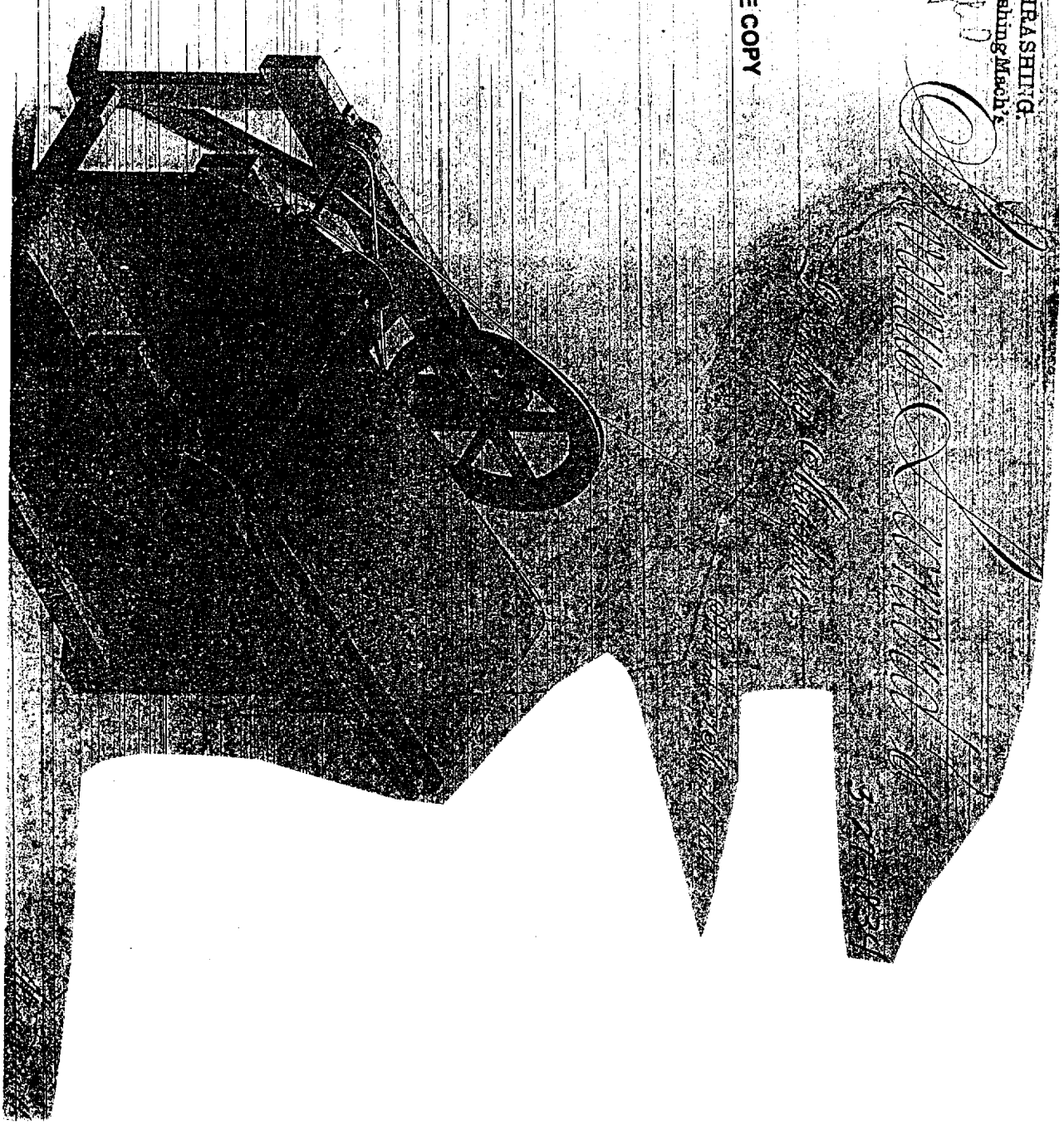
Reference
Main shaft
Pulleys
Beater
Crank bd
Inclined graduating table
Spring to the same
Fanning mills
Spring for the same
Feeding-table

Margaret Gerrish of Salem, – Massachusetts –

Letters Patent.

The Schedule referred to in these Letters Patent, and making part of the same, containing a description in the words of the said Margaret Gerrish herself of her discovery, material in the fibres of the external and internal cortex of the Asclepias Syriaca, and the method of manufacturing the same, –

To all to whom these presents shall come,

Be it known that I, Margaret Gerrish of Salem in the County of Essex, and State of Massachusetts, have discovered a new and useful material in the fibres of the external and internal cortex of the Asclepias Syriaca and the following is a full and exact description of the said Material as discovered by me, viz. It consists in a beautiful, plentiful long and strong fibre, and having been more or less engaged in making experiments upon the same and manufacturing it, altho upon a small scale, the five years past, the results have been such, I think, as to authorize the conclusion, that it will produce a fabric much superior in strength and beauty to linen – and one important advantage that it possesses over that article in common with cotton &c. is that it requires <u>no bleaching</u>, Very important when it is considered, that + linen thread is said to loose by the operation of bleaching from one third to one fourth of its weight, besides the time, labor, and expense of bleaching, The Asclepias also possesses the singular property of sustaining the repeated action of Water uninjured and unaffected to a degree unknown in other similar substances and this is an advantage that it has over silk which is well known will not bear the action of water, and it may be so prepared as to resemble silk or cotton After it is spun, in some preparations [illegible] [illegible] is being washed it resembles a delicately soft woolen yarn, In another

[illegible]

case when it has been longer subjected to the action of a solution of soap and washed after it is spun it resembles silk, and in some dressings it has somewhat the appearance of linen, and even cotton, so that the conclusion is, that by different preparations of the materials, different fabricks may be produced, And while it partakes in appearance of the properties of each of those materials it differs from all of them and is indeed a new material Some description of the plant Asclepias Syriaca —

This plant is a native of these States, and is thus described by Doctr Bigelow, in his "Florula Bostoniensis." Asclepias Syriaca common silk weed or milk weed, very common by road sides and borders of fields, Stem three or four feet high undivided. Leaves opposite, large oblong, umbels of flowers lateral and terminal; nodding July. Perennial Dr Cutter, observes, as quoted into Dr Thatchers Despensatory, that this species of Asclepias rises from three feet to six, I have measured it five feet eight inches, and I have since seen some that could not have been less than seven feet, the flowers are of a pale purpleish or pinkish hue, and remarkably sweet scented, the pods or follicles which may average six or eight upon a stem, contain from two to three hundred seeds each, which when fully ripened and the pods dried, they open into two parts, and the winged seeds are scattered by the winds, there appears to be a slight difference in the manner of its growth, while some of it rises up with a smooth round stem, others grow more of a square form, and not so smooth, but the round smooth stems are greatly to be preferred, these have also fewer leaves, which makes the stripping of the bark easier and makes less breakage in the fibres, Among all the plants producing a [illegible] like fibre, which I have met with I have observed none that are lactescent, to that degree that this is, i, e, not the [illegible] common to most plants, but abounding in a milk similar at least in appearance to a rich animal milk, like the milk of the cow, indeed approaching to cream in appea-
-rance, and which on breaking off the stems, or leaves, exudes most profusely, from which comparatively exclusive property no doubt, this species is distinguished from the others by the name of Milk weed, as from the silken down con-
-tained in the follicles, it is also called in common with the other species, silk weed, but which now from its pro-
-mising importance should forever drop the name of weed, and be allowed to take that of plant, The fibres being norrished with this rich milk, doubtless aquire that glossy and silk-like appearance, which they possess in a high degree, I have not observed any thing of the kind in linum but in unwinding the cocoon of the bombyx, I have observed an adhesive gum, Season of Cutting ——

The proper time for cutting, is when the plant is in full blow, which is in July, but in some seasons extends to August, at which time it is also in full milk and full fibre, - and the fibres are much more silk-like and beautiful at this period than at any other, and are much easier stripped from the cuticle at this period, The cutting however, may be continued to September —

Process of preparing it to Manufacture —

When cut which should be even with the soil, take off the leaves, tops, and flower, with a small knife, begin-
-ning at the lower part, of the stem, dividing the exterior cortex, say, into four parts, which makes a convenient width for stripping which done, it may be stripped piece by piece, generally the whole length of the stem; a conside-
-rable quantity may thus be stripped in a very short time after which the fibres are to be separated from the bark, which is very easily effected, by cutting across the bark bark and turning it back, with a small knife, when will
instantly be perceived, the delicately white and glossy fibres
beautifully arranged as it were for a web of cloth, which
by taking hold of with the thumb and fore finger may be
stripped out from two to four feet in length; The fibres thus
stripped from the interior of the exterior cortex, may be laid along
together carefully, lest they become entangled till a small parcel
be acquired convenient for handling, when it may be tied
together and thrown into pure water, where it may remain for
days or weeks shifting the water occasionally, After which
it may be thrown into a warm but weak solution of white
or common soap, which separates the fibres from whatever
of the green tender bark or milky particles which may still
adhere to them, which leaves them perfectly white and soft,
they may then be rinsed in pure water, and the same proceſs
repeated if necessary, Or it may be prepared by a cold pro-
ceſs which in some cases, and for some purposes, is preferable
to any other, But the most expeditious method of doing it
is, to immerge it immediately into a warm solution of soap
and raise the temperature if you wish to quicken the
operation, It should be wrung out with care as the fibres are
very delicate and being wet renders them liable to be broken
shake it gently and open it a little out but when partly dried
is the best time to open it effectually, It may then be
dried in the sun or shade, but the sun is to be preferred,
after which it will require to be more opened - when it
will be necessary to pass it through a fine comb but it
is not always necessary to pass it through a comb, it may
be sufficiently opened by hand for common purposes, it
is then prepared for manufacturing, I think from the ex-
periments which I have made, that the fibres can be taken
from the bark better after the bark has been stripped for
two or three days, and that the bark can be stripped from 3/27/1834 8111x the stem equally well after the lapse of several days or more which may sometimes be found convenient, The process of preparation being extremely simple, as has been shown, so much so, that it comes within the means of the humblest peasant, no apparatus being necessary but a small knife, a tub or run of water —

The shorter fibres which remain in the comb, after combing may be again subjected to the action of a hot or boiling solution of soap, until the fibres be sufficiently broken up for carding, which when done makes a very light, delicate and almost transparent batting, which can be manufactured into a wadding particularly suitable for silk dresses, and which may be coloured to correspond to any required shade,

Spinning

After having been thus dressed it is fit for spinning, which is done upon the common linen wheel, with a slight alteration in the present construction of a part of that Machine termed the distaff, In spinning this material there is much less to injure the eyes and lungs, than in cotton or flax, —

Colouring, —

This material when manufactured into a Thread, as above described, washed or boiled in a solution of soap, rinsed in fair water and slightly alumned is duly prepared to receive the colouring you may chuse to give it, Its attraction for coloring matters appears to be as strong and equal as that of silk, indeed it attracts the coloring particles more equally than that material, if we may judge from the account of those acquainted with the business, and decidedly more than that of cotton, or linen, which I should suppose a highly important object+ "we are told that cotton and linen do not take black that will resist soap," and that when intended to be dyed, they must be subjected to the operation of scouring, alumning, and galling, and that the preparation of silk with alum, is necessary in all cases" while the + Nicholson Dict. Art Dyeing —

Asclepias readily takes the coloring matter without even the
alumning, as is the case of some of those specimens offered
for inspection but then the alumning makes the color strike
deeper hold faster and appear brighter —
N. B. The Asclepias Syriaca, is said to be cultivated
in Europe and in this country, for the silken down attach
-ed to the seeds, which is used as a substitute for feathers,
fur, and cotton. The tender sprouts are eaten in the spring
for greens, and the *bark of the root of this species is also
highly medicinal" it is said to be very pleasant to travel
in the woods where it grows, especially in the evening,
the flowers are so very odoriferous, and that in Canada
they make sugar of them, gathering them in the morning
when they are covered with dew. If sugar can be pro
cured from the flowers, the value of the plant will be
greatly enhanced, because, the proper time for cutting the
plant to manufacture into cloth, is when it is in full
blossom which would be just the proper time for gathering
the flowers to make sugar, which otherwise would be
thrown away. — Comparative view of the culture and
preparation of Asclepias with linum and gossipium When we compare the culture of this plant and the
preparations necessary to the manufacturing of it, with that
of linen or even cotton, we shall find I think, that the
results are immensely in favour of the Asclepias. Let
us lend our attention for a moment to the subject. transplan
-ting it into a compact state, from the straggling state in
which it is naturally found to grow, is all that would be neces
-sary in the outset, or perhaps sowing the seeds as it would
forever after that propagate itself, being a perennial; as it would
not require to be renewed annually as flax does, and sulling
it even with the soil, as would be necessary, would just

* Bigelow [illegible] Tuckits Lisp '56, keep it in proper order, I should suppose its natural soil being
the way side, by walls and hedges, and borders of deserted
spots and fields; the natural inference appears to be, that
any common soil is the most proper for it, we will sup
-pose it thus transplanted, and being well rooted and grown
to maturity, and in full blossom in full milk, and consequent
-ly in full fibre, we have only to apply the sharp sickle,
or some similar instrument I supposed) and in a few
moments thousands of their proud heads may be levelled
with the earth X When the simple process as before described
may be fully resorted to. For flax we are told, that the
land must be , ~~[illegible]~~ well ploughed and laid
flat and even, then the seed are to be sown, and if a
wet season weeding will be necessary (and every two
or three crops, the, the seeds are to be renewed) and this
is to be repeated every year, when full grown it is to
be pulled, to be tied up, in handfulls, set up to dry and
when perfectly dried, housed, It is then to be watered
this process is said to be performed to the greatest advan
-tage in pits situated on the banks of rivers, where the
water may be changed often enough to prevent a degree
of putrefaction that would injure the flax, and be
prejudicial to the workmen, After this process, it is again
to be dried and twice swingled, and to pass through
two hackles, But for the finest uses it is to be [illegible]
into rolls and put into a trough and soundly beaten,
then opened and passed through the finest hackle and
three different sized [illegible], Of the waste in dressing there
is no comparison, If required to be white it must be sub
-jected to the operation of bleaching. For cotton we are in-
formed, that the soil should be extremely well prepared
and of the best quality for the reception of cotton seeds
when ripe the pods are to be picked, and after the husks have been disengaged, the cotton is put to two mills, one of a coarser operation than the other, for separating the seeds from the cotton. But after this it is not completely freed from its seeds and other foreign matter. It is then carefully picked by Women and Children, The next operation it undergoes is the process of washing it with soap; It is then to be pressed, after pressing it is to be spread and brought to the stoves to be dried, It is next to be carded, and then passed through the drawing machine, as many times as may be necessary to obtain the required fineness, then through the roving machine after which it arrives at the spinning frame, and this article in common with linen, if required to be white, must be subjected to the operation of bleaching

* Into thread, batting, socks and various other articles some of which together with the material in its natural state, and in a prepared state for manufacturing have been presented as true specimens of the above described material and manufacture as discovered and manufactured by me Margaret Gerrish Witnesses
D. Jenks Lander
Wm A Lander x?
G.W.

27 Ho Words